Patented Jan. 4, 1949

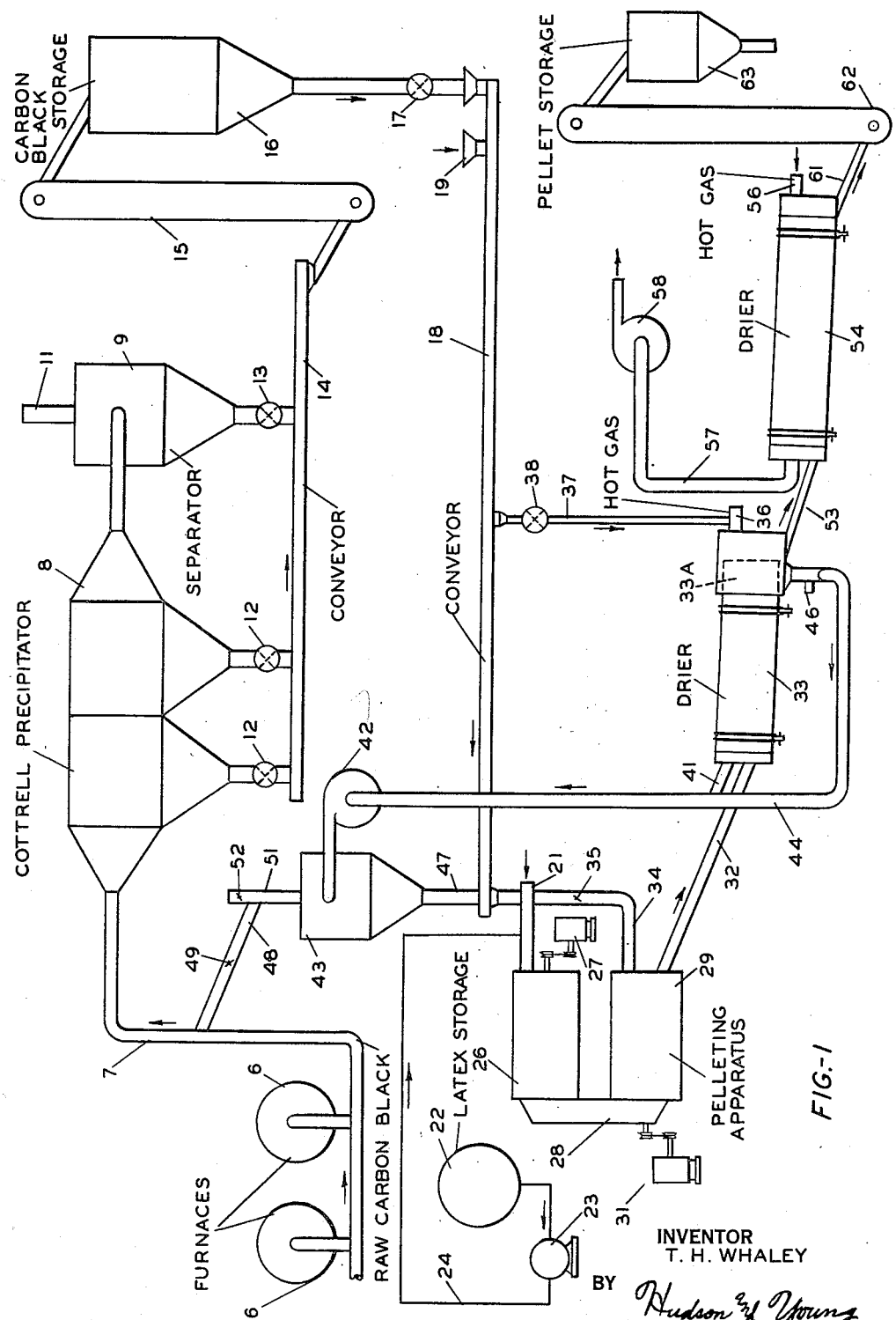

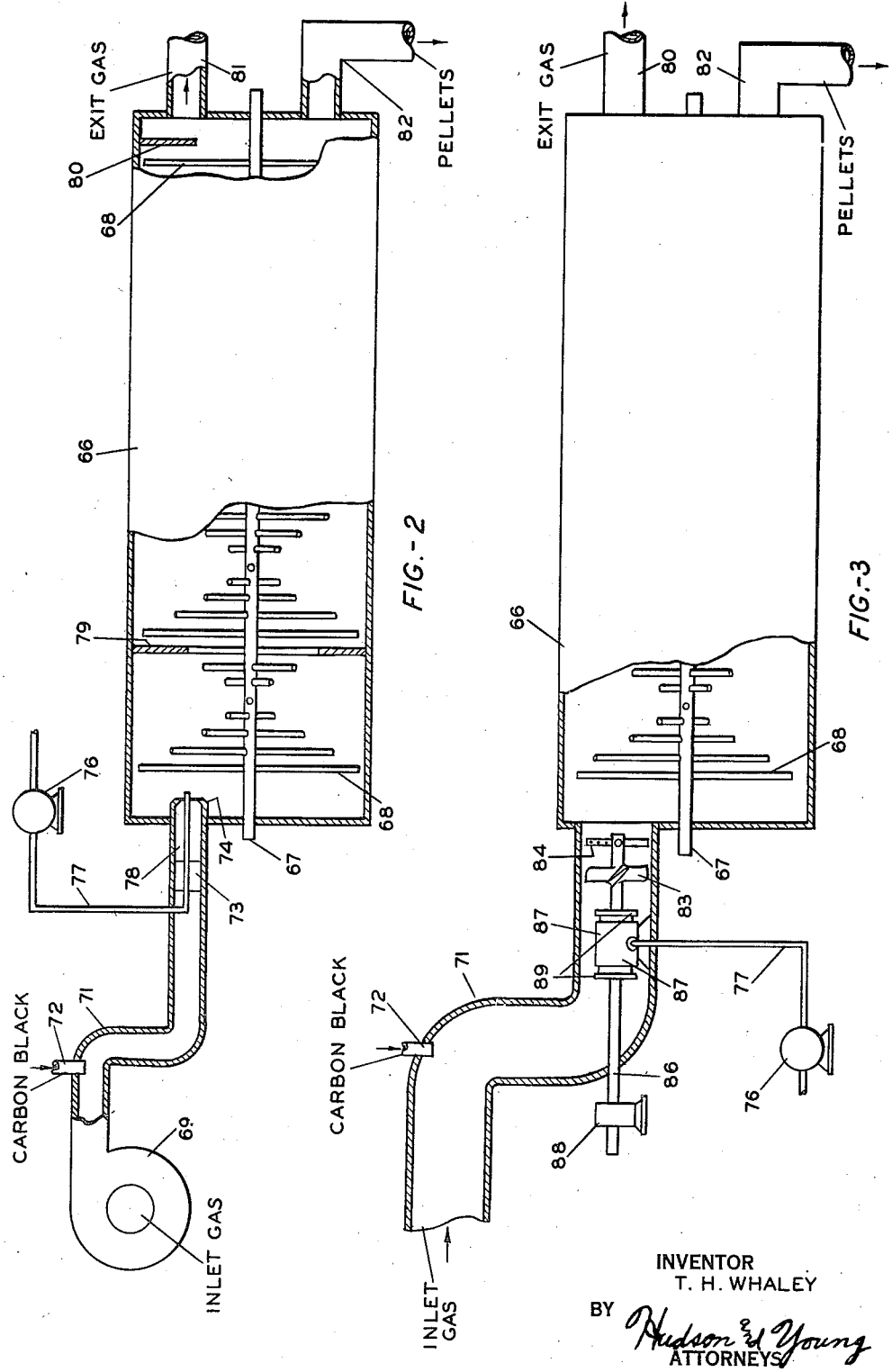

2,457,962

UNITED STATES PATENT OFFICE 2,457,962

AGGLOMERATION OF POWDERED MATERIAL

Thomas H. Whaley, Bartlesville, Okla., assignor to Phillips Petroleum Company, a corporation of Delaware Application February 19, 1945, Serial No. 578,738

5 Claims. (Cl. 260—766)

This invention relates to a process for the treatment of finely divided flocculent powders. The process of this invention is particularly applicable to the treatment of carbon black as initially produced to agglomerate the finely divided carbon black and produce a product of increased density which is suitable for componding into rubber.

As initially produced, carbon black is a finely divided flocculent powder having an apparent bulk density of about 3 pounds per cubic foot. This powder is easily dispersed in air as a dust which is a source of annoyance and somewhat of a hazard to the workmen in transporting and using the carbon black. Since the bulk density is so low, the powdered carbon black is very bulky in nature and occupies much valuable shipping space. For these reasons it is customary to reduce the bulk of the raw carbon black, i. e., the powdered carbon black as produced, by compressing it into cakes or by forming it into larger particles having an increased bulk density and less tendency to disperse in air. Particles in the form of small granules or pellets having a bulk density of about 25 pounds per cubic foot are now commercially marketed and used to a large extent in the rubber industry.

As previously stated, the raw carbon black has a bulk density of about 3 pounds per cubic foot. It may be densified by mechanical agitation to give a powder having a bulk density of about 12 pounds per cubic foot. Then densifying operation apparently reduces the quantity of air or other gases associated with the carbon black without appreciable agglomeration of the carbon black particles. The density may be further increased by mechanical agitation of the dry carbon black or by imparting a rolling motion to the carbon black particles. This operation forms agglomerates or pellets of carbon black resulting in particles ranging in size from about 8 mesh to about 100 mesh. Particles larger or smaller in size may be formed, but in general the foregoing range represents the desirable limits. Preferably the carbon black particles so formed are about 10 mesh in size, or within the range of about 8 mesh to about 40 mesh. Dry pelleting of carbon black has proven very satisfactory for channel blacks, but is less useful for pelleting of soft blacks, or furnace blacks.

Throughout this specification, the term pelleting is used to designate the agglomeration of powdered material into larger particles, regardless of the process by which the agglomeration is effected or the nature of the particle produced. The term pellet is used to designate the agglomerate particle.

Carbon black may be pelleted by any of the so-called wet pelleting processes. There are two methods of wet pelleting in general use. In one, the raw carbon black is admixed with sufficient water to form a paste, extruded through dies and broken into columner segments. The other method involves wetting of a portion of the raw carbon black, preferably with a fine spray, while subjecting the carbon black to mechanical agitation which agglomerates the carbon black. Pellets formed by either of these methods are subjected to a drying operation to remove the water therefrom prior to packaging and shipping.

Another method of increasing the bulk density of carbon black prior to shipping is used to some extent, particularly for soft blacks or furnace blacks. By this method the carbon black is first predensified as described hereinbefore to a bulk density of about 12 pounds per cubic foot and the predensified carbon black is then compressed into a cake having a bulk density of about 25 pounds per cubic foot. Often the predensified black is put in shipping containers, paper bags, for example, prior to the compressing operation. Prior to use, the cake of carbon black must be disintegrated. The bagging, compressing, and disintegrating operations cause large amounts of carbon black dust to be liberated, making these operations disagreeable for the operators.

Most of the carbon black processed by the foregoing methods is used in the rubber industry. The carbon black is admixed with crude natural or synthetic rubber, plasticizer, vulcanizing agents, age resistor, etc., for the manufacture of finished rubber products. Other fillers, for example, zinc oxide, iron oxide, or other finely divided solid, may be used in conjunction with or in place of carbon black in the rubber compounding formula. The mixing operation is designed to highly disperse the filler in the crude rubber. This is generally accomplished by mixing the ingredients in a Banbury type mixer followed by milling on heated rollers. It is desirable to effect high dispersion of the carbon black with the minimum amount of working, in minimum time, and without the liberation of objectionable dust. Throughout this specification the term rubber is used in its broadest sense and includes vulcanizable natural hydrocarbon gums and vulcanizable rubbery polymers or copolymers of polymerizable organic compounds; the former is generally designated as natural rubber while the latter is known as synthetic rubber. As applied in the art, the term synthetic rubber includes the polymerization products of olefins, diolefins, styrene and its derivatives, alkyl esters of acrylic and alkacrylic acid, such as methyl methacrylate, and other organic compounds having at least one active vinyl group ($CH_2=C<$). These compounds are polymerized alone or in admixture with one another.

The present invention provides a process for the pelleting of finely powdered materials to form pellets of substantially uniform size, or dustless character, and having the quality of being reading dispersed in rubber. The present process is particularly applicable to the pelleting of carbon black and is especially useful for pelleting soft black or furnace black. It is to be understood, however, that the present invention is not limited to the pelleting of carbon black, but that it may be used for pelleting of other fine powders, particularly those used in the compounding of natural or synthetic rubber. In accordance with this invention, carbon black is pelleted with latex as a wetting agent. Either natural or synthetic latex may be used, synthetic latex, however, is preferred. The product has high mechanical strength, resisting crushing under normal shipping conditions, yet is readily broken down and dispersed by milling. The term latex as used herein includes natural latex and synthetic latex, i. e., rubbery polymers of polymerizable organic compounds in aqueous emulsion, and is used also to include aqueous dispersions of rubber, and aqueous dispersions of unpolymerized polymerizable organic compounds.

In accordance with this invention, the flocculent powders are contacted with natural or synthetic latex in an amount sufficient to moisten at least a portion of the powder. The mixture of powdered material and latex is then formed into pellets. The use of latex in pelleting is suitable in two types of pelleting processes. In one, sufficient latex is used to form a paste or "dough" which is shaped into columnar segments by extrusion through dies. The process of forming pellets by this method is described in detail in U. S. Patent No. 2,283,364. The use of latex as a wetting agent in this process results in the formation of a new product comprising carbon black and rubber and having superior physical properties. The other process employs a smaller quantity of latex, sufficient to wet only a portion of the powder, and the pellets are formed by agitation of the mixture. Preferred specific embodiments of apparatus for pelleting by this process are disclosed in detail hereinafter as applied to pelleting of carbon black.

An object of this invention is to provide a process for pelleting flocculent powders.

A further object is to provide a process for treating carbon black to produce small agglomerated particles or pellets.

Another object is to provide such a process which is particularly useful for the pelleting of carbon black of the type known as soft black or furnace black.

Another object is to provide improved apparatus for the pelleting of carbon black and similar flocculent powders.

Still another object of this invention is to provide substantially dustless pellets from flocculent powdered materials incorporating rubber as a binder.

It is also an object of this invention to provide an improved carbon black product in the form of pellets containing rubber, which pellets are substantially dustless, withstand ordinary handling without appreciable crushing, and are readily dispersed in rubber during compounding.

Other objects and advantages will be apparent from the following detailed disclosure taken with reference to the accompanying drawings.

Fig. 1 of the drawings is a diagrammatic representation of apparatus suitable for carrying out the process of the present invention.

Fig. 2 is an elevation, partly in section, showing apparatus forming a part of this invention.

Fig. 3 is an elevation, partly in section, showing another embodiment of apparatus forming a part of the present invention.

In accordance with the present invention, as applied particularly to the pelleting of carbon black, the flocculent carbon black is contacted with a liquid emulsion as a binder which comprises desirable components of finished rubber goods. Natural or synthetic rubber latices, including aqueous dispersions of rubber, aqueous dispersions of polymers of polymerizable organic compounds, and aqueous dispersions of unpolymerized polymerizable organic compounds, are suitable as liquid binder. The carbon black, wetted or partly wetted by the latex, as defined herein, is formed into pellets. Preferred specific embodiments of the process and apparatus for pelleting carbon black in accordance with this invention are disclosed in detail hereinafter.

With reference to the accompanying drawings, the carbon black is produced in furnaces 6 and the gaseous products of combustion containing suspended carbon black passes through line 7 to a Cottrell precipitator 8. Part of the carbon black is separated from the combustion products in the Cottrell precipitator. The gaseous combustion products are then passed to separator 9 of the cyclone type in which substantially all of the remaining carbon black is separated from the effluent gases. The gaseous combustion products, essentially free from carbon black are discharged to the atmosphere through stack 11. Carbon black from the Cottrell precipitators is discharged through valves 12, and from separator 9, through valve 13, to a conveyor 14. This finely divided flocculent carbon black is conveyed to an elevator 15 which discharges it into an elevated storage tank 16. This serves as a surge bank between the producing equipment and the pelleting apparatus, specific embodiments of which are disclosed in detail hereinafter.

From the carbon black storage tank, flocculent carbon black is discharged through valve 17 into conveyor 18. Other suitable powdered material, for example, fillers used in conjunction with carbon black in compounding rubber, may be added through the hopper 19. The conveyor 18 discharges the carbon black into a gas stream entering duct 21 as described in detail in connection with Figs. 2 and 3. The carbon black is highly dispersed in the gas stream and contacted with atomized latex. The latex is stored in a suitable storage tank 22 from which it is withdrawn by pump 23 and passed through pipe 24 to the atomizers. Preferred specific embodiments of the atomizing apparatus are disclosed in Figs. 2 and 3. The gas-carbon black-latex mixture is discharged into suitable pelleting apparatus comprising a drum 26 provided with suitable agitators driven by a motor 27. Preferred specific embodiments of the pelleting apparatus are shown in Figs. 2 and 3. The carbon black and latex mixture is formed into pellets in the drum 26 from which it may be discharged through conduit 28 into a similar drum 29 provided with suitable agitators driven by motor 31. The second drum is not essential to the pelleting process since it will be apparent that the apparatus may be so designed as to produce the pellets in a single drum.

The amount of latex used to effect pelleting in the apparatus is variable, it being generally desirable to use an amount sufficient to wet a limited percentage of the carbon black to form nucleuses of carbon black and latex around which the pellets are formed. A part of the excess carbon black supplied adheres to the nucleuses to form the finished pellets. The pellets from the pelleting apparatus contain water and the synthetic or natural rubber, or component thereof. The pellets as produced, however, are not tacky or adhesive due to the coating of relatively dry carbon black on the surface of each pellet. The quantity of latex used may be varied over rather wide limits. In general, it is preferable to use from about 0.5 to about 1.5 parts latex by weight per part of carbon black. About 1.5 parts latex by weight per part of carbon black represents the upper limit in this apparatus. Higher proportions of latex cause the mixture to become too wet and tacky for this apparatus. Lower proportions of latex result is handling of a large quantity of excess carbon black which is not pelleted; this is generally uneconomical. For pelleting by extrusion mentioned hereinbefore, the amount of latex required is within the range of about 1.0 to about 1.5 parts latex by weight per part of carbon black.

From the pelleting apparatus, the pellets are passed via the conduit 32 to a first drier 33. Part or substantially all of the gas and suspended fine carbon black from the pelleting apparatus may be recycled via duct 34 as controlled by damper 35. The first drier 33 is preferably a rotary type drier provided with a screening section 33A for removal of fines. Heated gas for drying the pellets is supplied to drier 33 from any suitable source through inlet duct 36. Heated air or flue gas at a temperature within the range of about 300° F. to about 500° F., preferably 450° to 500° F., is generally suitable for the preliminary drying accomplished in drier 33. The volume of gas is so controlled, in relation to the amount of pellets fed to the drier, to prevent overheating of the pellets with resulting injury to the rubber content thereof. Generally, the pellets should not be heated to a temperature above about 250° F. to 300° F. The temperature of the hot gas leaving the drier is about 250° F. The high temperature gas effects rapid evaporation of water and volatile components of the original latex while at the same time this evaporation tends to prevent overheating of the pellets. The pellets as discharged from drier 33 preferably have a residual water content which is substantially completely removed in a second drier supplied with heated gas at a lower temperature.

To the hot gas stream entering drier 33 through inlet duct 36, flocculent carbon black may be added from pipe 37 as controlled by valve 38. Gas from the drier containing suspended particles of finely divided carbon black is withdrawn through duct 41 to an exhaust fan 42 and discharged into a separator 43, preferably of the cyclone type. Fines from the screening section 33A of the drier are conveyed to the exhaust fan through duct 44. Air for conveying the fines is admitted to duct 44 through an air inlet duct 46. In separator 43, the major proportion of the carbon black is separated from the gas stream. The carbon black so separated is admitted to the inlet duct 21 of the pelleting apparatus through pipe 47. The gas from the separator may be passed via duct 48, as controlled by damper 49, to line 7 for further recovery of finely divided carbon black from the gas stream. Alternatively, the gas may be discharged to the atmosphere through the vent pipe 51, as controlled by damper 52.

Partially dried carbon black pellets are discharged from drier 33 into a conduit 53 from whence they pass to a second drier 54. Hot air or gas is drawn into the drier 54 from any suitable source through inlet duct 56. Drier 54 is preferably of the rotary type; the Roto-Louvre drier, manufactured by Link-Belt Co., being particularly suited for this operation. The drying gas is withdrawn from the drier through duct 57 by an exhaust fan 58. The hot air or gas supplied to drier 54 is preferably at a temperature within the range of about 200° F. to about 300° F., preferably about 250 to 300° F. The moisture content of the pellets is reduced to about 2 per cent by weight in the second drier. The finished pellets are discharged through conduit 61 to elevator 62 which transfers the pellets to an elevated pellet storage bin 63 from which they may be withdrawn for shipment.

Figs. 2 and 3 of the drawings illustrate specific embodiments of pelleting apparatus forming a part of the present invention. With reference to Fig. 2, the pelleting apparatus comprises a drum 66 provided with an agitating mechanism comprising a rotatable shaft 67 to which are attached radial rods 68 longitudinally and radially along the length of the shaft. The shaft is rotated by a suitable prime mover, not shown in the drawing. This type agitator and its operation is well known in the art of carbon black pelleting. Air or other suitable gas is impelled by a fan 69 through inlet duct 71 into drum 66. Carbon black is added to the gas stream through inlet pipe 72. The carbon black is dispersed in the gas stream aided by a whirling motion imparted to the mixture by vanes 73 in the gas inlet duct. The inlet duct 71 is restricted in cross section at the point of discharge 74 into the pelleting apparatus. A suitable wetting liquid, preferably latex, is pumped under pressure by pump 76 through pipe 77 to the atomizer. The atomizer 78 breaks up the liquid into a fine spray which is discharged preferably at right angles to the stream of the gas containing dispersed carbon black. This assures intimate contact between the particles of carbon black and wetting liquid. Only a limited number of the carbon black particles contact the droplets of wetting liquid. The droplets of wetting liquid are coated with carbon black, which is then wetted by the liquid forming nucleuses for the carbon black pellets. The pellet is then built up by agitation of the nucleuses in the drum in an atmosphere of gas containing suspended finely divided carbon black. The atmosphere is continuously replenished by the stream of gas and carbon black supplied to the pelleting apparatus through the inlet duct. The drum 66 is preferably provided with baffles 79 and 80 to assure good distribution of the suspended carbon black in the apparatus and prevent carryover of larger particles in the gas stream. The gas stream containing some finely divided carbon black in suspension leaves the drum 66 via the outlet duct 81 from which it may be recycled to the inlet duct 71 or treated in any suitable manner for recovery of carbon black therefrom. Pellets are discharged from the drum through conduit 82.

With reference to Fig. 3, reference numerals corresponding to those of Fig. 2 are used to designate corresponding parts of the apparatus. In this embodiment a fan and rotary atomizers are provided at the inlet of drum 66. The fan 83 and atomizers 84 are constructed as a rotatable integral unit attached to shaft 86. The shaft 86 is mounted in bearings 87 and 88 and may be rotated by a suitable prime mover not shown in the drawing. The wetting liquid is supplied to the atomizers 84 from pipe 77 through the bearing 87 which is in communication with a passageway, not illustrated, in shaft 86 leading to the atomizers 84. Suitable packing means 89 prevent leakage of the wetting liquid from the bearing 87. The fan and atomizer of the type manufactured by the Coppus Engineering Corp. and sold under the trade name Fanmix is suitable for this purpose. The fan 83 highly disperses the carbon black in the gas stream created by the fan while the rotating atomizers provide highly efficient contacting of the atomized wetting liquid with the carbon black particles.

Based on the weight of the wet product produced by pelleting in accordance with this invention, the percentage of liquid in the wet product is within the range of about 30 to about 60. In general, when using latex as the wetting agent the percentage is higher than when less viscous wetting agents are used. The rubber content of the latex may be within the range of about 15 per cent by weight to about 35 per cent by weight. The rubber content of the dry product produced by the process of this invention is generally within the range of about 5 per cent by weight to about 20 percent by weight, depending largely upon the concentration of the latex, the nature of the powdered material used, and the quantity of latex employed. The product produced is in the form of dense particles less than about one quarter inch in diameter and having relatively smooth surfaces of a substantially non-adhesive character.

While latex is the preferred wetting liquid for use in carrying out the process of this invention, the specific embodiments of the pelleting apparatus illustrated in Figs. 2 and 3 are useful in pelleting with other wetting liquids, for example, with water. The moving gas stream containing dispersed particles of the powdered material to be pelleted and the intimate contact established by atomization of wetting liquid into, and preferably at right angles to, the gas stream results in the production of a very uniform product. It will be evident to one skilled in the art that various changes may be made in the process and apparatus herein disclosed, and in the operation thereof, without departing from the spirit of this invention.

I claim:

1. As a product of manufacture, carbon black in the form of separate compact granules of carbon block having an adhesive internal structure containing from about 5 to about 20 per cent rubber by weight and a substantially non-adhesive external surface consisting substantially of carbon black.

2. The process of making a carbon black product which comprises wetting dry flocculent carbon black with latex, forming the wetted carbon black into pellets, contacting said wet pellets with further dry flocculent carbon black, contacting the pellets containing latex with heated dry gas at a temperature within the range of about 300° F. to about 500° F. for a period of time sufficient to remove the major portion of the water therefrom, and contacting the partly dried pellets with a second stream of dry gas at a temperature within the range of about 200 to about 300° F. for a period of time sufficient to remove substantially all of the remaining water therefrom.

3. The process of making a carbon black product which comprises wetting a dry flocculent carbon black with latex, forming the wetted carbon black into pellets, contacting the wet pellets so formed with dry carbon black, and drying the resultant pelleted product.

4. Apparatus for pelleting flocculent carbon black which comprises a propeller for creating a moving stream of gas, means for introducing flocculent carbon black into said gas stream upstream from said propeller, means integral with said propeller and rotatable therewith for introducing atomized liquid into said gas stream at right angles to the flow of said gas stream, and means downstream from said introduction of said liquid for maintaining said carbon black and said liquid in agitated condition in said gas stream until agglomerates of carbon black and said liquid are formed.

5. Apparatus for pelleting flocculent carbon black which comprises propulsion means for creating a moving stream of gas, means for introducing flocculent carbon black into said gas stream upstream of said propulsion means, means integral with said propulsion means for introducing atomized liquid into said gas stream, and means downstream from said atomized liquid introduction means for maintaining said carbon black and said liquid in agitated condition in said gas stream until agglomerates of carbon black and said liquid are formed.

THOMAS H. WHALEY.

REFERENCES CITED

The following references are of record in the file of this patent:

UNITED STATES PATENTS

| Number | Name | Date |
| --- | --- | --- |
| Re. 22,454 | Wiegand et al. | Mar. 7, 1944 |
| 2,002,252 | Stam | May 21, 1935 |
| 2,009,435 | Coolidge et al. | July 30, 1935 |
| 2,063,921 | Gray | Dec. 15, 1936 |
| 2,123,482 | De Jong | July 12, 1938 |
| 2,161,508 | Ensor et al. | June 6, 1939 |
| 2,167,432 | Cox et al. | July 25, 1939 |
| 2,213,056 | Skoog et al. | Aug. 27, 1940 |
| 2,229,534 | Walton | Jan. 21, 1941 |
| 2,288,087 | Hanson et al. | June 30, 1942 |
| 2,306,698 | Heller | Dec. 29, 1942 |
| 2,315,924 | Bertram | Apr. 6, 1943 |